March 25, 1969 — H. STONE — 3,434,377
TOOL POST AND TOOL HOLDER
Filed April 12, 1967 — Sheet 1 of 3
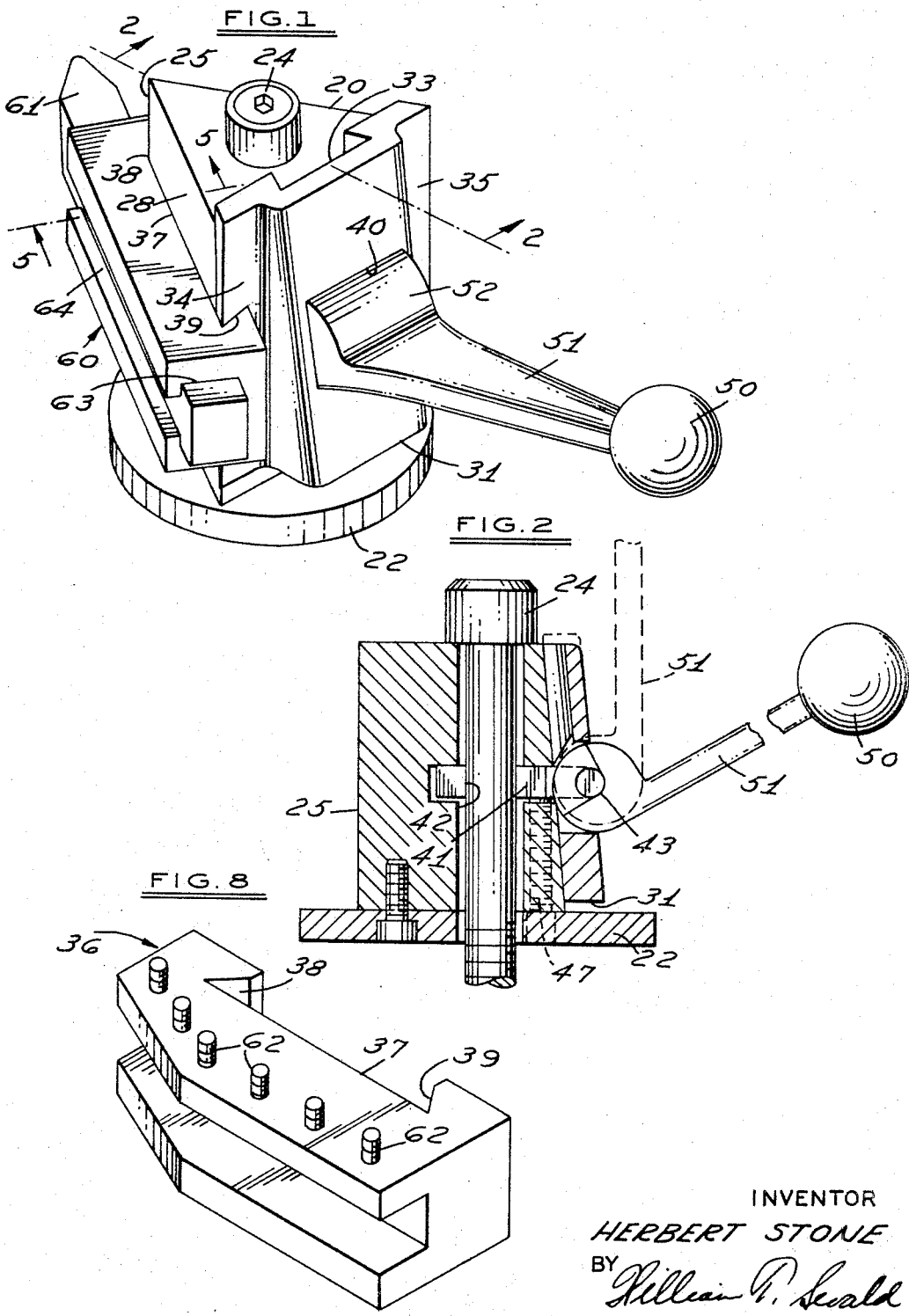
INVENTOR
HERBERT STONE
BY
ATTORNEY

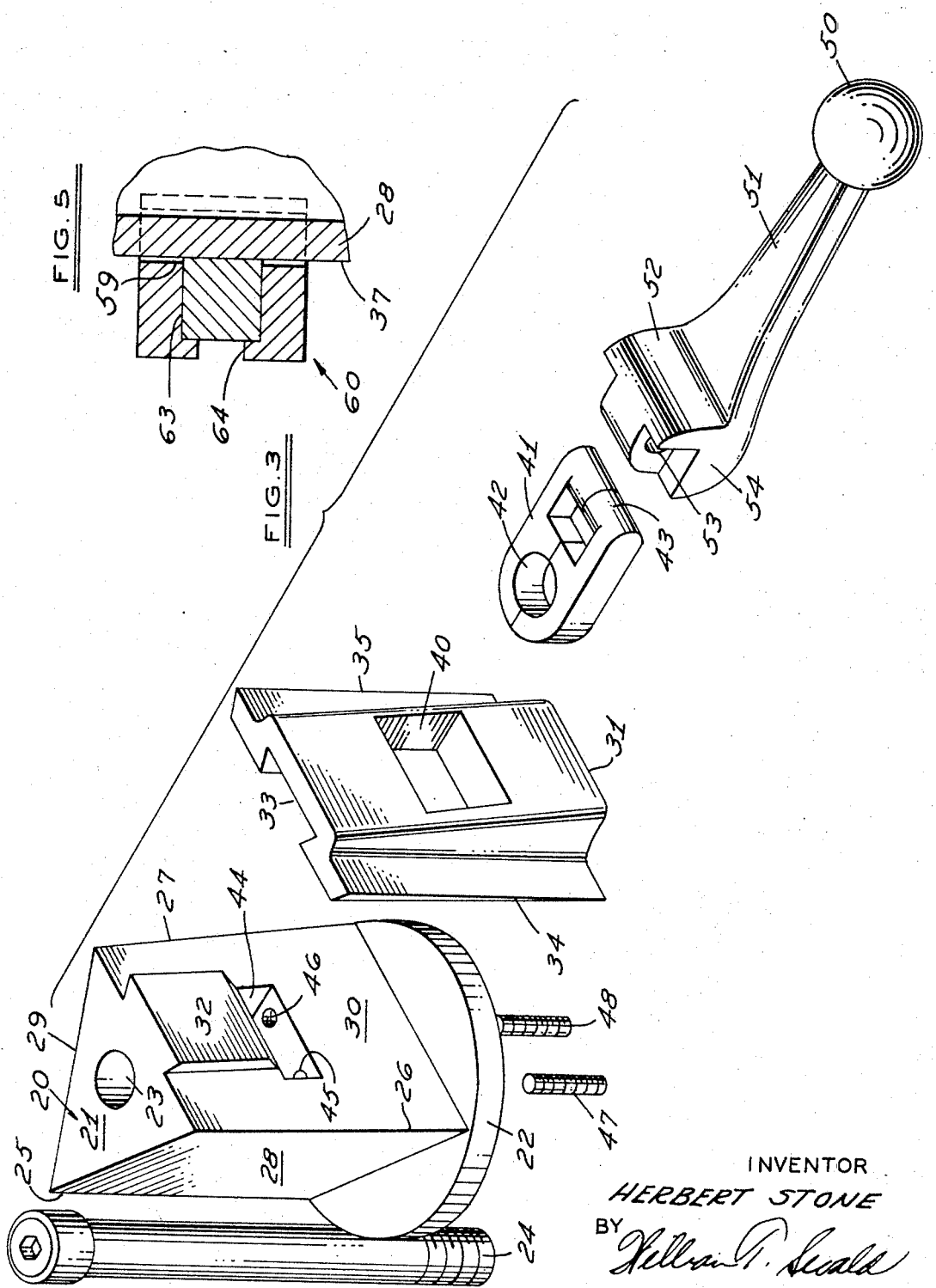

March 25, 1969     H. STONE     3,434,377
TOOL POST AND TOOL HOLDER
Filed April 12, 1967     Sheet 3 of 3
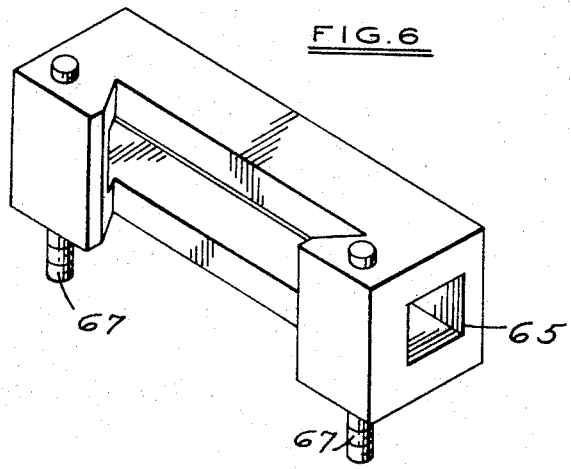
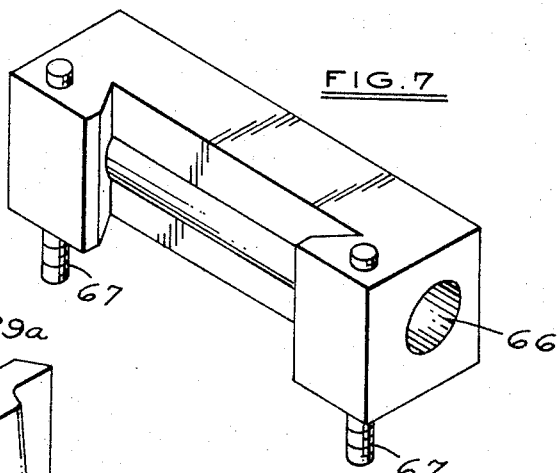
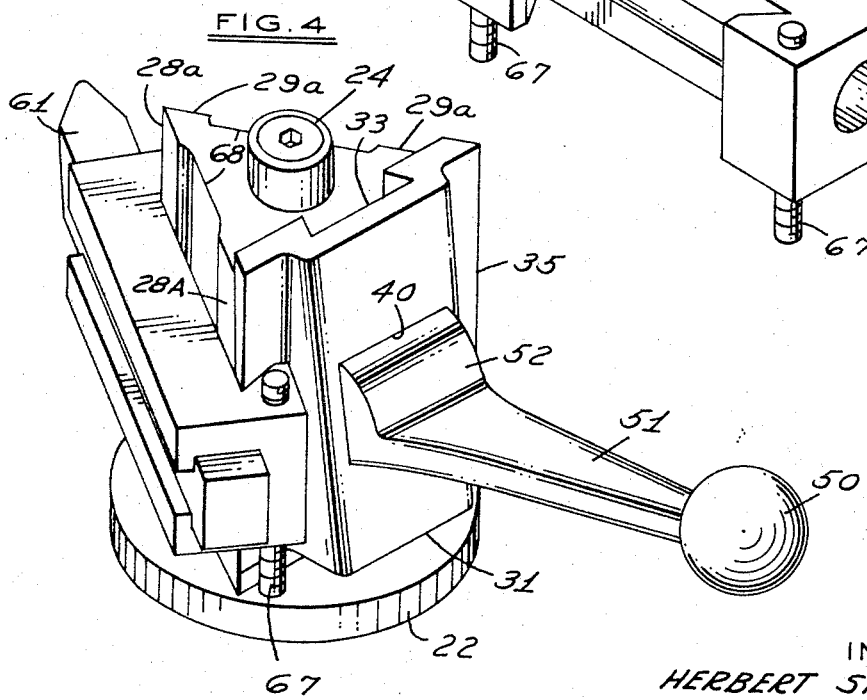
INVENTOR
HERBERT STONE
BY
ATTORNEY United States Patent Office 3,434,377
Patented Mar. 25, 1969

3,434,377
TOOL POST AND TOOL HOLDER
Herbert Stone, 822 Wyandotte Ave.,
Royal Oak, Mich. 48067
Filed Apr. 12, 1967, Ser. No. 630,382
Int. Cl. B23b 29/00
U.S. Cl. 82—37          9 Claims

ABSTRACT OF THE DISCLOSURE

This invention relates to tool posts for machine tools and in particular relates to a tool post having a fixed corner tenon and at least one movable corner tenon triangulated and cooperating with one another for engaging a mortised tool holder in a dovetail joint wherein the tool holder is not only cammed toward the post inwardly of the tool holder but also abutted by the post inwardly of the tool holder.

Various tool posts have been employed heretofore to mount tools on machines including posts using dovetail joints, however the several devices of the prior art are bulky, awkward, have excessive overhang, and encounter difficulty in holding tools at acute angles to a center line. Moreover the devices of the prior art are complicated in design and construction, expensive to manufacture, and difficult to use.

With the foregoing in view, it is a primary object of the invention to provide a tool post which is trim, streamlined, has minimal overhang, is facile in holding tools at an acute angle to a center line, which is simple in design and construction, inexpensive to manufacture, and easy and reliable in use.

An object of the invention is to provide a tool post which gives more clearance for the tools, enables positioning the tool cutting edge closer to the post, and simplifies the mounting of the tool on the post.

An object of the invention is to provide a tool post having a fixed tenon and at least one movable tenon triangulated relative to one another for camwise engaging a mortised tool holder inwardly of the dovetail grooves of the tool holder with the span portion of the tool holder between the grooves resistance-wise pressed against the post inwardly of the dovetail grooves of the tool holder.

An object of the invention is to provide a tool post having a fixed dovetail tenon and at least one movable dovetailed tenon adapted to move toward and away from the fixed tenon and a blocking face on the post between the tenons so that a tool holder having dovetail groove sides engaging the tenons and a spanning portion between the dovetail groove sides is locked against the post by relative outward movement of the tenons camming against the groove sides of the holder moving the spanning portion of the holder toward the post and into jamming engagement with the post blocking face.

An object of the invention is to provide a tool post which cams the tool holder toward the post inwardly of the tool holder and which resists and blocks the inwardly cammed movement of the tool holder by the face of the post lying inwardly of the tool holder engaging the spanning portion of the tool holder.

An object of the invention is to provide a wedge slide on the post having a corner or edge constituting the movable tenon.

An object of the invention is to provide a wedge slide on the post having two corners or edges constituting paired movable tenons on triangulated corners of the post.

An object of the invention is to provide a tool post which engages a mortised tool holder internally thereby obviating the necessity of providing external means for engaging the tool holder externally of the tool holder.

An object of the invention is to provide a mortised tool holder having a tool receiving slot opening through its side toward the post so that a tool may be held between the holder and the post by forceably engaging the tool between the tool holder and the post in camming the holder toward the post.

An object of the invention is to provide cam means for moving the wedge slide bidirectionally of the post to move a movable tenon closer to and farther from the fixed tenon with locking and unlocking force.

An object of the invention is to provide cooperating slide means on the post and wedge slide to guide the wedge slide linearly in its movement relative to the post.

An object of the invention is to provide a base plate on the post providing abutment means for cooperating with height or position locating means on a tool holder such as set screws on the tool holder engaging the base plate on the tool post.

These and other objects of the invention will become apparent by reference to the following description of tool posts embodying the invention and patentable features, taken in connection with the accompanying drawings, in which:

FIG. 1 is a top oblique perspective view of a tool post, tool holder, and tool shown in secured and locked condition.

FIG. 2 is a cross-section view of the device seen in FIG. 1 taken on the line 2—2 of FIG. 1 illustrating the locked position in solid lines and showing the unlocked position of the wedge slide and operating handle in dotted lines.

FIG. 3 is an exploded perspective view of the various parts of the tool post seen in FIGS. 1 and 2.

FIG. 4 is a view similar to FIG. 1, showing a post having an engaging face modified by an interrupting channel and set screws on the tool holder in engagement with the base plate.

FIG. 5 is a cross sectional view of the tool holder portion of the device seen in FIG. 1 taken on the line 5—5 thereof illustrating the pressed engagement of the tool between the tool holder and the post.

FIG. 6 is a perspective view of a tool holder having an internally open-sided rectangular tool receiving channel and a closed outer side.

FIG. 7 is a view of a tool holder similar to FIG. 6 showing a round tool receiving channel; and FIG. 8 is a perspective view of a tool holder having an external tool receiving channel and set screws for securing the tool in the channel.

Referring now to the drawings wherein like numerals refer to like and corresponding parts throughout the several views, the tool posts disclosed therein to illustrate the invention and patentable features, comprise a body 20. The body 20, FIGS. 1–3, may have a triangular top surface 21 and a triangular bottom surface, not fully shown, similar to the surface 21. The body 20 may be mounted on a base plate 22. A central aperture 23 may be provided to receive a bolt 24 to attach the body 20 on a machine. Obviously the body 20 may be secured to the base plate 22 and the base plate 22 secured to a machine by suitable means such as machine screws.

As shown the body 20 has a fixed front corner tenon 25 and two fixed rear nontenon corners 26 and 27. These corners are triangulated relative to one another. A planar side face 28 lies between the front corner tenon 25 and the back corner 26 and a planar side face 29 lies between the front corner tenon 25 and the back corner 27. The side faces 28 and 29 converge at the fixed front corner tenon 25 and are spaced apart at the fixed rear corners 26 and 27. A back face 30 lies between the fixed rear corners 26 and 27. A slide 31 overlies the back face 30. Guide means are provided to guide the slide 31 linearly over the back face 30 such as up and down with the post positioned vertically. Dovetail slide means having a tenon portion 32 on the body 20 and a groove portion 33 in the slide 31 may be employed. The slide 31 has side edges 34 and 35 overlying the fixed rear corners 26 and 27 respectively. The side edges 34 and 35 of the slide 31 constitute movable back corner tenons 34 and 35 respectively.

Since only the fixed front corner tenon 25 and one of the movable back corner tenons 34 and 35 are used at any one time, it will be understood that the invention does not require three corners although they are shown for convenience and to illustrate the triangulation of any two corners used. Also the post is shown vertically positioned but it may be positioned as desired.

The slide 31 may be wedge-shaped as shown and the back side 30 on the body 20 may be inclined as shown to constitute an inclined plane. Obviously only one need be inclined to effect the wedging action. Both are shown inclined or tapered to set forth the optional construction. When both inclinations are used, with one complementing the other, the back corner tenons 34 and 35 maintain a position closer to vertical in moving up and down with the slide 31 and this reduces bias in engaging a mortised tool holder.

It will be understood from the description of the device to this point, with upward movement of the slide 30 as shown, that the movable rear corner tenons 34–35 are positioned closer to the fixed front corner tenon 25 and, conversely, with downward movement of the slide 31 as shown, that the movable rear corner tenons 34, 35 are positioned farther away from the fixed front corner tenon 25.

A tool holder 36 has a mortised groove defined by a spanning portion 37 and paired, opposite, reversely angled cam portions 38 and 39, FIG. 8. As shown, the cam portion 38 fits around the front corner tenon 25 and engages the sides surface 29; the cam portion 39 fits around the movable back corner tenon 34 and engages the face of the slide 31; and the spanning portion 37 engages the planar side face 28.

Suitable means for moving the slide 31 may include on opening 40 in the slide 31. A fulcrum piece 41 lies in the opening 40 and has an aperture 42 for receiving the bolt 24. The fulcrum piece 41 has a pin portion 43. The body 20 also has an opening 44 which receives the fulcrum piece 41 and threaded apertures 45 and 46. Machine set screws 47 and 48 lie in the apertures 45 and 46 and engage the fulcrum piece 41 and secure it relative to the body 20. The fulcrum piece 41 may be of split construction as shown. A handle 50 has a lever arm 51, cam portions 52 and 54, and an aperture 53. The aperture 53 receives the pin portion 43 of the fulcrum piece 41 and the cam portions 52 and 54 engage the top and bottom walls of the slide 31 forming the opening 40. The split construction of the fulcrum piece facilitates supporting the pin portion 43 from both sides.

With the handle 50 in the solid line position of FIGS. 1, 2, and 4, the cam portion 54 urges the slide 31 downwardly on the inclined plane moving the rear corner tenons 34, 35 outwardly away from the fixed front corner tenon 25. With the handle 50 in the dotted line position of FIG. 2, the cam portion 52 urges the slide 31 upwardly on the inclined plane moving the rear corner tenons 34, 35 inwardly toward the front corner tenon 25.

As illustrated and embodied, the downward position of the slide 31 and handle 50 is the locked tool holder engaging position; the upward position of the slide 31 and handle 50 is the unlocked tool holder releasing position.

A tool holder 60 has a cam surface 38 engaging the fixed tenon 25 and a cam surface 39 engaging the movable tenon 34 or 35. When the slide 31 moves toward the locked position the tenons 25 and 34 or 35 cam the tool holder 60 toward the face 28 or 29 so that the span portion 37 is pressed thereagainst. This locks the tool holder 60 on the post body 20. When the slide 31 is moved into the unlocked position, the movable tenon 34 or 35 moves toward the fixed tenon 25 and releases the outward camming action on the cam surfaces 38 and 39 and the tool holder 60 is freed of pressed engagement with the post body 20.

In the event that a tool holder 36 of the type seen in FIG. 8 is used, the spanning portion 37 itself is jammed against the surface 28 or 29 of the post body 20 and the tool 61 secured by set screws 62. However when a tool holder 60 of the type seen in FIGS. 1, 4, 6, and 7 is used, the tool holder has a tool receiving channel 63 housing the tool 61. This channel 63 has an open side 59, FIG. 5, toward the post body surface 28 or 29. The channel 63 is so dimensioned that the tool 61 projects slightly sidewise outwardly beyond the spanning surface 37, FIG. 5. Thus when the tool holder 60 is locked against the post, the tool 61 is jammed between the tool holder 60 and the post body surface 28 or 29 and this locks both the tool 61 and the tool holder 60 on the post. The tool holder may have an outer open slot 64 as seen in FIG. 1 or a closed outer wall 65 as seen in FIG. 6. The channels 63 of the tool holders may be rectangular as seen in most of the figures. The channel also may be cylindrical as seen in FIG. 7 at 66. Obviously the tool receiving channel may be any shape and conformation such as a standard or Morse taper. Also the tool holders may be equipped with set screws 67 as seen in FIGS. 4, 6, and 7 for engaging the bottom plate 22 on the tool post body 20. The set screws 67 facilitate accurately positioning the tool holder as to height and hold the tool holders at the desired height against the drag of the slide 31 in its camming movement against the tool holder.

FIG. 4 shows a modified post having its engaging face surfaces interrupted by a recess 68 obviating engaging the tool or tool holder in the central portion of the surface preventing rocking and providing spaced engaging faces 28a and 29a adjacent the tenon corners 25, 34, and 35, insuring spaced contact at the tenon corners. The spaced engaging faces 28a and 29a also reduce the area of the engaging surface so that the force of the engagement is concentrated in a small area making the grip force more intense relative to area.

It is to be particularly noted that the post body 20 engages the tool holder inwardly of the tool holder both as to camming action and abutment. This completely eliminates overhanging abutment on the post for engaging the outside of the tool holder. This enables the tool to be located closely adjacent the post and facilitates close tool positioning relative to a center line especially at acute angles.

While only a few embodiments and modifications have been disclosed and described to illustrate the invention, it will be obvious that many changes may be made in the size, shape, detail, and arrangements of the various elements of the invention within the scope of the appended claims.

I claim:
1. A tool post comprising
   a body having at least two triangulated corners with one said corner constituting a fixed tenon,
   said body having triangulated sides between said corners with one said side lying opposite said fixed tenon and constituting a slide face, and
   a slide overlying said slide face having at least one edge constituting a movable tenon relative to said fixed tenon;
   said fixed and movable tenons being adapted to fit within a mortised tool holder having cam grooves engaging said tenons and a spanning portion over said triangulated included side lying between said tenons;

at least one said slide face and said slide being inclined relative to said fixed tenon so that movement of said slide relative to said slide face in one direction moves said movable tenon toward said fixed tenon in unlocking action relative to a mortised tool holder and movement of said slide relative to said slide face in the opposite direction moves said movable tenon away from said fixed tenon in locking action relative to a mortised tool holder.

2. In a device as set forth in claim 1, guide means on said slide face and guide means on said slide coöperating with each other to guide said slide along a line in its movement relative to said body.

3. In a device as set forth in claim 1, fulcrum means on said body and a lever engaging said fulcrum means and said slide; said lever being adapted to move said slide linearly of said body.

4. In a device as set forth in claim 1, said slide face lying on a plane inclined in one direction and said slide being wedge shaped and lying in a plane inclined in the opposite direction.

5. In a device as set forth in claim 1, cam pivot means on said body, a cam on said cam pivot means engaging said slide, and an actuating arm on said cam; said cam being adapted to move said slide linearly over said slide face of said body.

6. In a device as set forth in claim 1, said triangulated sides constituting abutments for a mortised tool holder within a tool holder and inwardly of said engaging tenon corners of said body.

7. In a device as set forth in claim 1, a base plate on said body extending sidewise outwardly of said body constituting a platform for engaging height establishing means on a mortised tool holder.

8. In a device as set forth in claim 1, a mortised tool holder dovetailed on said front corner tenon and one said back corner tenon over one said triangulated side; said tool holder having a tool receiving channel having an open side toward said side and a tool engaging side opposite said open side; and a tool in said holder lying between said body side and said holder engaging side; said tool and said holder being secured by said holder jamming said tool against said side face.

9. In a device as set forth in claim 1, said sides being interrupted in their central portion by a relief to prevent a tool or holder rocking on the central portion and to provide increased force of contact of the tool and holder adjacent said tenons.

References Cited

UNITED STATES PATENTS 3,368,449  2/1968  Robinson _____ 82—36

FOREIGN PATENTS 338,672  7/1959  Switzerland.

LEONIDAS VLACHOS, *Primary Examiner.*